(12) United States Patent
Shlens et al.

(10) Patent No.: US 11,450,120 B2
(45) Date of Patent: Sep. 20, 2022

(54) OBJECT DETECTION IN POINT CLOUDS

(71) Applicant: Waymo LLC, Mountain View, CA (US)

(72) Inventors: Jonathon Shlens, San Francisco, CA (US); Patrick An Phu Nguyen, Palo Alto, CA (US); Benjamin James Caine, San Francisco, CA (US); Jiquan Ngiam, Mountain View, CA (US); Wei Han, Mountain View, CA (US); Brandon Chauloon Yang, Saratoga, CA (US); Yuning Chai, San Mateo, CA (US); Pei Sun, Palo Alto, CA (US); Yin Zhou, San Jose, CA (US); Xi Yi, Mountain View, CA (US); Ouais Alsharif, Mountain View, CA (US); Zhifeng Chen, Sunnyvale, CA (US); Vijay Vasudevan, Los Altos Hills, CA (US)

(73) Assignee: Waymo LLC, Mountain View, CA (US)

( * ) Notice: Subject to any disclaimer, the term of this patent is extended or adjusted under 35 U.S.C. 154(b) by 64 days.

(21) Appl. No.: 16/923,823

(22) Filed: Jul. 8, 2020

(65) Prior Publication Data

US 2021/0012089 A1  Jan. 14, 2021

Related U.S. Application Data

(60) Provisional application No. 62/871,669, filed on Jul. 8, 2019.

(51) Int. Cl.
*G06V 20/64* (2022.01)
*G06T 7/136* (2017.01)
*G06V 20/58* (2022.01)

(52) U.S. Cl.
CPC ............ *G06V 20/647* (2022.01); *G06T 7/136* (2017.01); *G06V 20/58* (2022.01);
(Continued)

(58) Field of Classification Search
CPC .......... G06K 9/00201; G06K 9/00208; G06K 9/00791; G06K 9/00805; G06T 7/136;
(Continued)

(56) References Cited

U.S. PATENT DOCUMENTS

2009/0028442 A1* 1/2009 Kimmel ............. G06K 9/00214
382/218
2013/0202197 A1* 8/2013 Reeler ................ G06K 9/00201
382/154

(Continued)

OTHER PUBLICATIONS

Abdullah et al., "LIDAR segmentation using suitable seed points for 3D building extraction," International Archives of the Photogrammetry, Remote Sensing & Spatial Information Sciences, Sep. 2014, XL-3:8 pages.

(Continued)

*Primary Examiner* — Kenny A Cese
(74) *Attorney, Agent, or Firm* — Fish & Richardson P.C.

(57) ABSTRACT

Methods, systems, and apparatus, including computer programs encoded on computer storage media, for processing point cloud data representing a sensor measurement of a scene captured by one or more sensors to generate an object detection output that identifies locations of one or more objects in the scene. When deployed within an on-board system of a vehicle, the object detection output that is generated can be used to make autonomous driving decisions for the vehicle with enhanced accuracy.

20 Claims, 4 Drawing Sheets

(52) U.S. Cl.
CPC ............... *G06T 2207/10028* (2013.01); *G06T 2207/20084* (2013.01); *G06T 2207/30252* (2013.01)

(58) Field of Classification Search
CPC . G06T 2207/10028; G06T 2207/30252; G06T 2207/20084; G06V 20/647; G06V 20/58
See application file for complete search history.

(56) References Cited

U.S. PATENT DOCUMENTS

| | | |
|---|---|---|
| 2017/0220876 A1 | 8/2017 | Gao et al. |
| 2018/0144496 A1 | 5/2018 | Posner |
| 2018/0188038 A1 | 7/2018 | Yang |
| 2019/0147250 A1* | 5/2019 | Zhang .................. G06T 3/0031 382/224 |
| 2019/0188541 A1* | 6/2019 | Wang ....................... G01C 3/08 |
| 2019/0258876 A1* | 8/2019 | Liu ..................... G06K 9/00805 |
| 2020/0151557 A1* | 5/2020 | Nezhadarya ........... G06N 20/10 |
| 2021/0232871 A1* | 7/2021 | Iancu ................. G06K 9/00805 |

OTHER PUBLICATIONS

Alexe et al., "Measuring the objectness of image windows," IEEE Transactions on Pattern Analysis and Machine Intelligence, Nov. 2012, 34(11):2189-2202.
Angelova et al., "Real-time pedestrian detection with deep network cascades," Proceedings of BMVC, 2015, 12 pages.
Atzmon et al., "Point convolutional neural networks by extension operators," CoRR. Mar. 2018, arXiv:1803.10091, 14 pages.
Bertinetto et al., "Fully-convolutional Siamese networks for object tracking," European conference on computer vision, 2016, 16 pages.
Bogoslavskyi et al., "Fast range image-based segmentation of sparse 3D laser scans for online operation," 2016 IEEE/RSJ International Conference on Intelligent Robots and Systems, 2016, 7 pages.
Bojarski et al., "End to end learning for self-driving cars," CoRR, Apr. 2016, arXiv:1604.07316, 9 pages.
Burges et al., "Learning to rank using gradient descent," Proceedings of the 22nd International Conference on Machine learning, Aug. 2005, pp. 89-96.
Caesar et al., "nuScenes: A multimodal dataset for autonomous driving," Proceedings of the IEEE/CVF Conference on Computer Vision and Pattern Recognition, 2020, pp. 11621-11631.
Cao et al., "Learning to rank: from pairwise approach to listwise approach," Proceedings of the 24th International Conference on Machine Learning, Jun. 2007, pp. 129-136.
Carreira et al., "CPMC: Automatic object segmentation using constrained parametric min-cuts," IEEE Transactions on Pattern Analysis and Machine Intelligence, 2012, 34(7):1312-1328.
Cohen et al., "Learning to order things," JAIR, 1999, 10:243-270.
Dai et al., "Scannet: Richly-annotated 3d reconstructions of indoor scenes," Proceedings of the IEEE Conference on Computer Vision and Pattern Recognition, 2017, pp. 5828-5839.
Dean et al., "Fast, accurate detection of 100,000 object classes on a single machine," Proceedings of the IEEE Conference on Computer Vision and Pattern Recognition, 2013, pp. 1814-1821.
Endres et al., "Unsupervised discovery of object classes from range data using latent dirichlet allocation," Robotics: Science and Systems, 2:8 pages.
Everingham et al., "The pascal visual object classes (VOC) challenge," International Journal of Computer Vision, 2010, 88(2):303-338.
Feichtenhofer et al., "Detect to track and track to detect," Proceedings of the IEEE International Conference on Computer Vision, pp. 2017, 3038-3046.
Felzenszwalb et al., "Object detection with discriminatively trained part-based models," IEEE Transactions on Pattern Analysis and Machine Intelligence, 2010, 32(9):1627-1645.

Geiger et al., "Vision meets robotics: The KITTI dataset," The International Journal of Robotics Research, Aug. 2013, 32(11):1231-1237.
Girshick et al., "Fast r-cnn," Proceedings of the IEEE International Conference on Computer Vision, 2015, pp. 1440-1448.
Girshick et al., "Rich feature hierarchies for accurate object detection and semantic segmentation," Proceedings of the IEEE Conference on Computer Vision and Pattern Recognition, 2014, pp. 580-587.
Golovinskiy et al., "Min-cut based segmentation of point clouds," 2009 IEEE 12th International Conference on Computer Vision Workshops, ICCV Workshops, 8 pages.
Gordon et al., "Re3: Real-time recurrent regression networks for visual backing of generic objects," IEEE Robotics and Automation Letters, Apr. 2018, 3(2):788-795.
Held et al., "Learning to track at 100 FPS with deep regression networks," European Conference on Computer Vision, 2016, pp. 749-765.
Huang et al., "Speed/accuracy trade-offs for modern convolutional object detectors," Proceedings of the IEEE conference on computer vision and pattern recognition, 2017, pp. 7310-7311.
Jouppi et al., "In-datacenter performance analysis of a tensor processing unit," ISCA '17: Proceedings of tire 44th Annual International Symposium on Computer Architecture, Jun. 2017, pp. 1-12.
Kingma et al., "Adam: A method for stochastic optimization," CoRR, Dec. 2014, arxiv.org/abs/1412.6980, 15 pages.
Krizhevsky et al., "Imagenet classification with deep convolutional neural networks," Communications of the ACM, May 2017, 60(6):84-90.
Lang et al., "Pointpillars: Fast encoders for object detection from point clouds," Proceedings of the IEEE/CVF Conference on Computer Vision and Pattern Recognition, 2018, pp. 12697-12705.
Law et al., "Cornernet: Detecting objects as paired keypoints," Proceedings of the European Conference on Computer Vision, 2018, pp. 734-750.
LeCun et al,. "Deep learning," Nature, 2015, 521(7553):436.
Li et al., "Efficient dense point cloud object reconstruction using deformation vector fields," Proceedings of the European Conference on Computer Vision, 2018, 17 pages.
Liang et al., "Multi-task multi-sensor fusion for 3D object detection," Proceedings of the IEEE Conference on Computer Vision and Pattern Recognition, 2019, pp. 7345-7353.
Lin et al., "Feature pyramid networks for object detection," Proceedings of the IEEE Conference on Computer Vision and Pattern Recognition, 2017, 10 pages.
Lin et al., "Focal loss for dense object detection," Proceedings of the IEEE International Conference on Computer Vision, 2017, pp. 2980-2988.
Lin et al., "Microsoft coco: Common objects in context," European conference on computer vision, 2014, pp. 740-755.
Liu et al., "SSD: Single Shot Multibox Detector," European conference on computer vision, Sep. 2016, pp. 21-37.
Luo et al., "Fast and furious: Real time end-to-end 3D detection, tracking and motion forecasting with a single convolutional net," Proceedings of the IEEE Conference on Computer Vision and Pattern Recognition, 2018, pp. 3569-3577.
Meyer et al., "LaserNet: An efficient probabilistic 3D object detector for autonomous driving," Proceedings of the IEEE/CVF Conference on Computer Vision and Pattern Recognition, 2019, pp. 12677-12686.
Nan et al., "Polyfit: Polygonal surface reconstruction from point clouds," Proceedings of the IEEE International Conference on Computer Vision, 2017, pp. 2353-2361.
Ngiam et al., "Targeted Computation for Object Detection in Point Clouds," CoRR, Aug. 2019, arxiv.org/abs/1908.11069, 12 pages.
Patil et al., "The H3D dataset for full-surround 3d multi-object detection and tracking in crowded urban scenes," International Conference on Robotics and Automation, 2019, 6 pages.
PCT International Search Report and Written Opinion in International Appln. No. PCT/US2020/041200, dated Oct. 26, 2020, 19 pages.

(56) References Cited

OTHER PUBLICATIONS

Qi et al., "Frustum pointnets for 3d object detection from RGB-D data," Proceedings of the IEEE Conference on Computer Vision and Pattern Recognition, 15 pages.

Qi et al., "Pointnet: Deep learning on point sets for 3D classification and segmentation," Proceedings of the IEEE Conference on Computer Vision and Pattern Recognition, 2017, pp. 652-660.

Qi et al., "Pointnet ++: Deep hierarchical feature learning on point sets in a metric space," Advances in Neural Information Processing Systems, 2017, 10 pages.

Redmon et al., "You only look once: Unified, real-time object detection," Proceedings of the IEEE conference on computer vision and pattern recognition, 2016, pp. 779-788.

Ren et al., "Faster r-cnn: Towards real-time object detection wit region proposal networks," Advances in neural information processing systems 28, 2015, 9 pages.

Rowley et al., "Human face detection in visual scenes," Advances in Neural Information Processing Systems, 1996, 8:875-881.

Sermanet et al., "Pedestrian detection with unsuper vised multi-stage feature learning," Proceedings of the IEEE Conference on Computer Vision and Pattern Recognition, 2013, pp. 3626-3633.

Shi et al., "PointRCNN: 3d object proposal generation and detection from point cloud," Proceedings of the IEEE/CVF Conference on Computer Vision and Pattern Recognition, 2019, pp. 770-779.

Uijlings et al., "Selective search for object recognition," International Journal of Computer Vision, 2013, 104(2):154-171.

Vaillant et al., "Original approach for the localization of objects in images," IEEE Proceedings—Vision, Image and Signal Processing, 1994, 141(4):245-250.

Wang et al., "Deep paramedic continuous convolutional neural networks," Proceedings of the IEEE Conference on Computer Vision and Pattern Recognition, 2018, pp. 2589-2597.

Wu et al., "3D ShapeNets: A deep representation for volumetric shapes," Proceedings of the IEEE conference on computer vision and pattern recognition, 2015, pp. 1912-1920.

Wu et al., "Pointconv: Deep convolutional networks on 3D point clouds," Proceedings of the IEEE/CVF Conference on Computer Vision and Pattern Recognition, 2019, pp. 9621-9630.

Xie et al., "Attentional ShapeContextNet for point cloud recognition," Proceedings of the IEEE Conference on Computer Vision and Pattern Recognition, 2018, pp. 4606-4615.

Xu et al., "How powerful are graph neural networks?" CoRR, Oct. 2018, arXiv:1810.00826, 17 pages.

Yan et al., "Second: Sparsely embedded convolutional detection," Sensors, 2018, 18(10):3337.

Yang et al., "Hdnet: Exploiting HD maps for 3D object detection," Proceedings of The 2nd Conference on Robot Learning, PMLR, 2018, 87:146-155.

Yang et al., "IPOD: Intensive point-based object detector for point cloud," CoRR, Dec. 2018, arXiv:1812.05276, 9 pages.

Yang et al., "PIXOR: Real-time 3d object detection from point clouds," Proceedings of the IEEE Conference on Computer Vision and Pattern Recognition, 2018, pp. 7652-7660.

Zaheer et al,. "Deep sets," 31st Conference on Neural Information Processing Systems, 2017, 11 pages.

Zeng et al., "3DMatch: Learning local geometric descriptors from RGB-D reconstructions," Proceedings of the IEEE Conference on Computer Vision and Pattern Recognition, 2017, pp. 1802-1811.

Zhou et al., "Bottom-up object detection by grouping extreme and center points," Proceedings of the IEEE/CVF Conference on Computer Vision and Pattern Recognition, 2019, pp. 850-859.

Zhou et al., "Real-time kd-tree construction on graphics hardware," ACM Transactions on Graphics, Dec. 2008, 27(5):1-1.

Zhou et al., "Voxelnet: End-to-end learning for point cloud based 3d object detection," Proceedings of the IEEE Conference on Computer Vision and Pattern Recognition, 2018, pp. 4490-4499.

International Preliminary Report on Patentability in International Appln. No. PCT/US2020/041200, dated Jan. 20, 2022, 12 pages.

\* cited by examiner

OBJECT DETECTION IN POINT CLOUDS

CROSS-REFERENCE TO RELATED APPLICATIONS

This application claims priority to U.S. Provisional Application No. 62/871,669, filed on Jul. 8, 2019. The disclosure of the prior application is considered part of and is incorporated by reference in the disclosure of this application.

BACKGROUND

This specification relates to processing point cloud data using neural networks.

Neural networks are machine learning models that employ one or more layers of nonlinear units to predict an output for a received input. Some neural networks include one or more hidden layers in addition to an output layer. The output of each hidden layer is used as input to or more other layers in the network, i.e., one or more other hidden layers, the output layer, or both. Each layer of the network generates an output from a received input in accordance with current values of a respective set of parameters.

SUMMARY

This specification describes a system implemented as computer programs on one or more computers in one or more locations that processes point cloud data representing a sensor measurement of a scene captured by one or more sensors to generate an object detection output that identifies locations of one or more objects in the scene.

According to a first aspect, there is provided a system for detecting objects within point clouds. The system obtains point cloud data representing a sensor measurement of a scene captured by one or more sensors and including three-dimensional points in the scene, and then determines multiple two-dimensional proposal locations based on the three-dimensional points in the scene. The system generates, for each two-dimensional proposal location, a feature representation from three-dimensional points in the point cloud data that are near the two-dimensional proposal location. The system then processes the feature representations of the two-dimensional proposal locations using an object detection neural network that is configured to generate an object detection output that identifies objects in the scene.

The subject matter described in this specification can be implemented in particular embodiments so as to realize one or more of the following advantages.

The system described in this specification can process point cloud data representing a sensor measurement of a scene captured by one or more sensors to generate an object detection output that identifies locations of one or more objects in the scene. The one or more sensors can be sensors of an autonomous vehicle (e.g., LIDAR sensors), the scene can be a scene that is in the vicinity of the autonomous vehicle, and the object detection output can be used to make autonomous driving decisions for the vehicle, to display information to operators or passengers of the vehicle, or both. The system implements a non-convolutional point-based network designed specifically for point cloud data that can generate accurate object detection outputs with minimal latency and at a relatively low computational cost. In contrast, many conventional approaches to classifying or detecting objects within point cloud data involve projecting point clouds into 2D planar images and processing such point clouds as if they are camera images using computationally-heavy convolutional image processing techniques to detect objects in the resulting images. By employing processing techniques initially developed to address challenges unique to camera-based 2D imagery, such approaches fail to take full advantage of some of the features of point clouds, such as their relatively high sparsity in 3D space. Moreover, because such approaches employ convolutional image processing techniques in which all spatial positions in an image are treated equally, by virtue of employing non-convolutional techniques for object detection, the system described in this specification also has the advantage of being capable of selectively directing computation to different spatial regions in the scene. In some examples, the system is configured to leverage this capability to adapt the amount of computation that is dedicated to each spatial region in the scene to system priorities, resource availability, or both. By manipulating the sampling procedure at inference time, the system may dynamically alter the computational demand by tuning the number of proposals that are determined without having to alter or retrain the system's point-based network. This framework not only allows the system to be flexibly targeted across a range of computational priorities, but also enables the system to generate object proposals in a manner geared to maximize spatial coverage or match the density of point clouds. Given the need for accurate real-time information in autonomous vehicles and the nature of their surroundings, the system described in this specification may better fit the requirements of autonomous vehicle-based perception systems.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
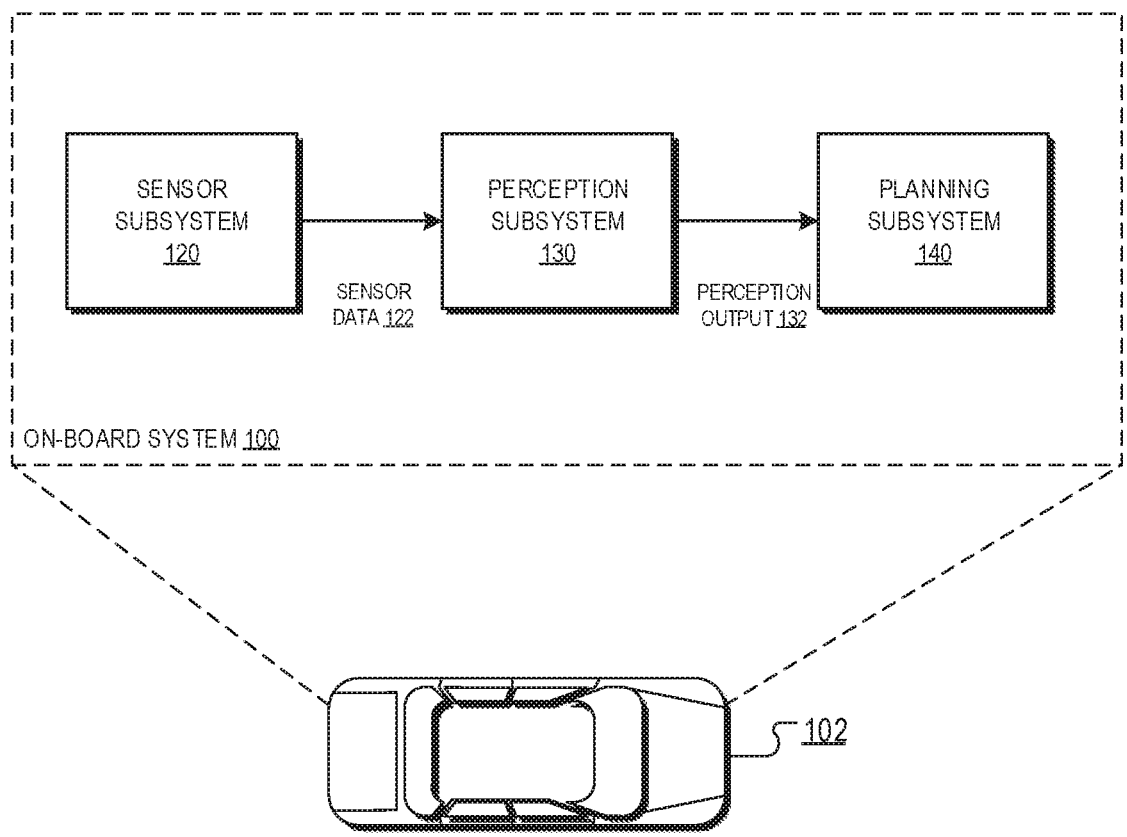
FIG. 1 shows a block diagram of an example on-board system.

This specification describes a system implemented as computer programs on one or more computers in one or more locations that processes point cloud data representing a sensor measurement of a scene captured by one or more sensors to generate an object detection output that identifies locations of one or more objects in the scene. For example, the one or more sensors can be sensors of an autonomous vehicle, e.g., a land, air, or sea vehicle, and the scene can be a scene that is in the vicinity of the autonomous vehicle. The object detection output can then be used to make autonomous driving decisions for the vehicle, to display information to operators or passengers of the vehicle, or both.

In particular, the system receives point cloud data representing a sensor measurement of a scene captured by one or more sensors. The point cloud data includes a set of three-dimensional points, i.e., a set of points corresponding to reflections identified by one or more scans of the scene by the one or more sensors, and optionally features generated by the one or more sensors for the three-dimensional points, e.g., LiDAR features. Each three-dimensional point generally has x, y, and z coordinates (or three different coordinates in a different coordinate system).

The system determines, based on the three-dimensional points in the scene, a plurality of two-dimensional proposal locations. In particular, the system samples a fixed number of two-dimensional locations from the locations of the three-dimensional points. In other words, the system designates a pair of coordinates, e.g., (x,y), from the three coordinates representing the three-dimensional points and then samples a fixed number of two-dimensional proposal locations from among the designated coordinates, e.g., the (x,y) coordinates, of the three-dimensional points in the scene.

The system can sample the fixed number of two-dimensional proposal locations in any of a variety of data dependent but computationally efficient ways. As one example, the system can sample the fixed number of two-dimensional proposal locations using farthest point sampling, in which individual points are selected sequentially such that the next point selected is maximally far away from all previous points selected. As another example, the system can sample the fixed number of two-dimensional proposal locations using random uniform sampling, in which each two-dimensional proposal location is randomly sampled from a uniform distribution over the three-dimensional points, i.e., the (x,y) coordinates of each three-dimensional point are equally likely to be sampled.

The system generates, for each two-dimensional proposal location, a feature representation from three-dimensional points in the point cloud data that are near the two-dimensional proposal location. In some implementations, the system can modify this phase of the object detection process based on the amount of computational resources available for the processor the latency requirements for the object detection process. In particular, the system can adjust how many points are used for each two-dimensional proposal location to satisfy the resource or latency requirements, i.e., the system can adapt the object detector to different computational settings without needing to re-train any of the neural network layers that are used by the object detector. When fewer points need to be used to satisfy the requirements, the system can prioritize the points that have higher predictive priorities or that are in spatial regions that are likely to be relevant. For example, in the case of a self-driving vehicle, the system can prioritize points that are likely to be relevant to operation of the vehicle.

The system then processes the feature representations of the two-dimensional proposal locations using an object detection neural network that is configured to generate an object detection output that identifies objects in the scene.

These features and other features are described in more detail below.

FIG. 1 is a block diagram of an example on-board system 100. The on-board system 100 is physically located on-board a vehicle 102. The vehicle 102 in FIG. 1 is illustrated as an automobile, but the on-board system 100 can be located on-board any appropriate vehicle type. The vehicle 102 can be a fully autonomous vehicle that makes fully-autonomous driving decisions or a semi-autonomous vehicle that aids a human operator. For example, the vehicle 102 can autonomously apply the brakes if a full-vehicle prediction indicates that a human driver is about to collide with a detected object, e.g., a pedestrian, a cyclist, another vehicle. While the vehicle 102 is illustrated in FIG. 1 as being an automobile, the vehicle 102 can be any appropriate vehicle that uses sensor data to make fully-autonomous or semi-autonomous operation decisions. For example, the vehicle 102 can be a watercraft or an aircraft. Moreover, the on-board system 100 can include components additional to those depicted in FIG. 1 (e.g., a control subsystem or a user interface subsystem).

The on-board system 100 includes a sensor subsystem 120 which enables the on-board system 100 to "see" the environment in a vicinity of the vehicle 102. The sensor subsystem 120 includes one or more sensors, some of which are configured to receive reflections of electromagnetic radiation from the environment in the vicinity of the vehicle 102. For example, the sensor subsystem 120 can include one or more laser sensors (e.g., LIDAR sensors) that are configured to detect reflections of laser light. As another example, the sensor subsystem 120 can include one or more radar sensors that are configured to detect reflections of radio waves. As another example, the sensor subsystem 120 can include one or more camera sensors that are configured to detect reflections of visible light.

The sensor subsystem 120 repeatedly (i.e., at each of multiple time points) uses raw sensor measurements, data derived from raw sensor measurements, or both to generate sensor data 122. The raw sensor measurements indicate the directions, intensities, and distances traveled by reflected radiation. For example, a sensor in the sensor subsystem 120 can transmit one or more pulses of electromagnetic radiation in a particular direction and can measure the intensity of any reflections as well as the time that the reflection was received. A distance can be computed by determining the time which elapses between transmitting a pulse and receiving its reflection. Each sensor can continually sweep a particular space in angle, azimuth, or both. Sweeping in azimuth, for example, can allow a sensor to detect multiple objects along the same line of sight.

In particular, the sensor data 122 includes point cloud data that characterizes the latest state of an environment (i.e., an environment at the current time point) in the vicinity of the vehicle 102. A point cloud is a collection of data points defined by a given coordinate system. For example, in a three-dimensional coordinate system, a point cloud can define the shape of some real or synthetic physical system, where each point in the point cloud is defined by three values representing respective coordinates in the coordinate system, e.g., (x, y, z) coordinates. As another example, in a three-dimensional coordinate system, each point in the point cloud can be defined by more than three values, wherein three values represent coordinates in the coordinate system and the additional values each represent a property of the point of the point cloud, e.g., an intensity of the point in the point cloud. Point cloud data can be generated, for example, by using LIDAR sensors or depth camera sensors that are on-board the vehicle 102. For example, each point in the point cloud can correspond to a reflection of laser light or other radiation transmitted in a particular direction by a sensor on-board the vehicle 102.

The on-board system 100 can provide the sensor data 122 generated by the sensor subsystem 120 to a perception subsystem 130 for use in generating perception outputs 132.

The perception subsystem 130 implements components that identify objects within a vicinity of the vehicle. The components typically include one or more fully-learned machine learning models. A machine learning model is said to be "fully-learned" if the model has been trained to compute a desired prediction when performing a perception task. In other words, a fully-learned model generates a perception output based solely on being trained on training data rather than on human-programmed decisions. For example, the perception output 132 may be a classification output that includes a respective object score corresponding to each of one or more object categories, each object score representing a likelihood that the input sensor data characterizes an object belonging to the corresponding object category. As another example, the perception output 132 can include data defining one or more bounding boxes in the sensor data 122, and optionally, for each of the one or more bounding boxes, a respective confidence score that represents a likelihood that an object belonging to an object category from a set of one or more object categories is present in the region of the environment shown in the bounding box. Examples of object categories include pedestrians, cyclists, or other vehicles near the vicinity of the vehicle 102 as it travels on a road.

The on-board system 100 can provide the perception outputs 132 to a planning subsystem 140. When the planning subsystem 140 receives the perception outputs 132, the planning subsystem 140 can use the perception outputs 132 to generate planning decisions which plan the future trajectory of the vehicle 102. The planning decisions generated by the planning subsystem 140 can include, for example: yielding (e.g., to pedestrians identified in the perception outputs 132), stopping (e.g., at a "Stop" sign identified in the perception outputs 132), passing other vehicles identified in the perception outputs 132, adjusting vehicle lane position to accommodate a bicyclist identified in the perception outputs 132, slowing down in a school or construction zone, merging (e.g., onto a highway), and parking. The planning decisions generated by the planning subsystem 140 can be provided to a control system of the vehicle 102. The control system of the vehicle can control some or all of the operations of the vehicle by implementing the planning decisions generated by the planning system. For example, in response to receiving a planning decision to apply the brakes of the vehicle, the control system of the vehicle 102 may transmit an electronic signal to a braking control unit of the vehicle. In response to receiving the electronic signal, the braking control unit can mechanically apply the brakes of the vehicle.

In order for the planning subsystem 140 to generate planning decisions which cause the vehicle 102 to travel along a safe and comfortable trajectory, the on-board system 100 must provide the planning subsystem 140 with high quality perception outputs 132. Many approaches to classifying or detecting objects within point cloud data involve projecting point clouds into 2D planar images and processing such point clouds as if they are camera images, e.g., using image processing techniques such as those involving the use of convolutional neural network (CNN) architectures or convolutional operations, to detect objects in the resulting images. However, such approaches are oftentimes quite computationally demanding, such that running inference on high resolution images is often not feasible in many systems. Given that predictions must be made by the perception subsystem 130 with minimal latency in order to ensure that accurate planning decisions can be made by the planning subsystem 140, and further that computational resources within vehicle 102 must travel with the vehicle and thus may be limited, the on-board system 100 may be seen as an example of one such system.

Thus, to generate perception outputs with sufficient accuracy and at a relatively low computational cost, the perception subsystem 130 may implement a non-convolutional object detector designed specifically for point cloud data that may better fit the requirements of autonomous vehicles. The architecture and functionality of such an object detector is described in further detail below with reference to FIG. 2.

Figure 2:
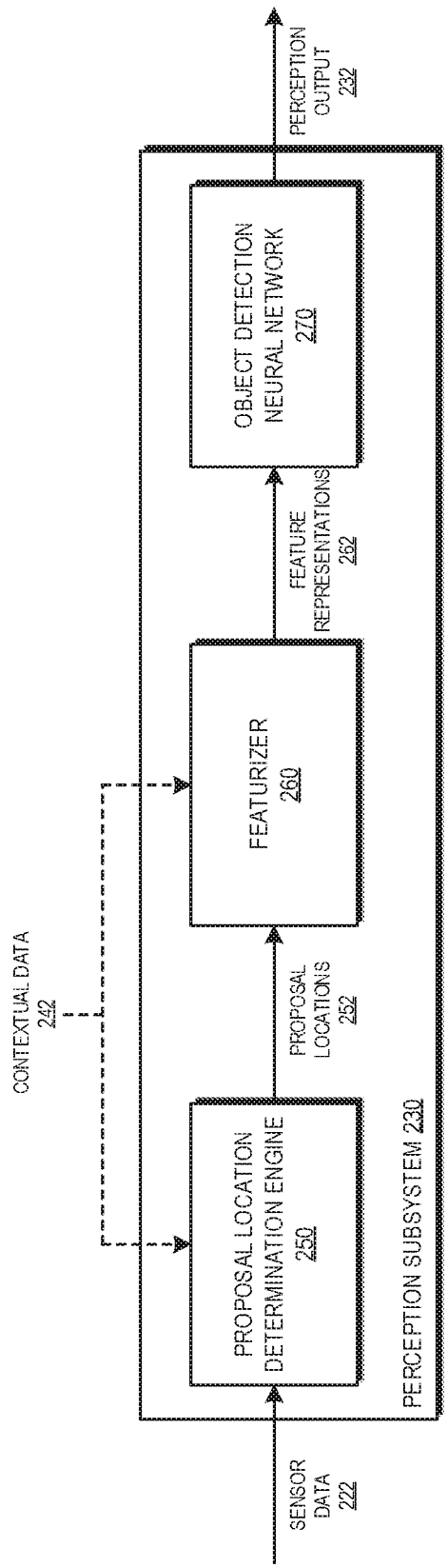
FIG. 2 shows a block diagram of an example perception subsystem.

FIG. 2 is a block diagram of an example perception subsystem 230. The perception subsystem 230 is an example of a system implemented as computer programs on one or more computers in one or more locations in which the systems, components, and techniques described below are implemented. In some implementations, the perception subsystem 230 of FIG. 2 may correspond to the perception subsystem 130 as described above with reference to FIG. 1. As depicted in FIG. 2, the perception subsystem 230 includes a proposal location determination engine 250, a featurizer 260, and an object detection neural network 270. Briefly, and as described in further detail below, given a location in a point cloud, the perception subsystem 230 determines or selects a subset of neighboring points in the point cloud, featurizes these points, and regresses these points to object class and bounding box parameters. Importantly, the object location is predicted relative to the selected location and does not employ any global information, i.e., information for points that are outside the subset of neighboring points in the point cloud. This setup ensures that each spatial location may be processed by the perception subsystem 230 independently, which may enable computation of each location by the perception subsystem 230 to be parallelized to decrease inference latency.

The proposal location determination engine 250 receives sensor data 222 as input and determines, based at least in part on sensor data 222, a set of proposal locations 252. The sensor data 222 includes point cloud data representing a sensor measurement of a scene captured by one or more sensors and including multiple three-dimensional points in the scene, and the proposal locations 252 that are determined by the proposal location determination engine 250 include multiple two-dimensional proposal locations. In some examples, the sensor data 222 may correspond to sensor data 122 as described above with reference to FIG. 1.

More specifically, in some implementations, each of the three-dimensional points in the scene has respective (x, y) coordinates, and the two-dimensional proposal locations 252 that are determined by the proposal location determination engine 250 correspond to the (x, y) coordinates where individual points reside in the point cloud. As such, in some implementations, to determine the proposal locations 252, the proposal location determination engine 250 may determine or sample a fixed number of two-dimensional proposal locations from among the (x, y) coordinates of the three-dimensional points in the scene.

In these implementations, the proposal location determination engine 250 may any employ of a variety of different techniques to determine or sample two-dimensional proposal locations from among the (x, y) coordinates of the three-dimensional points in the scene. As one example, the proposal location determination engine 250 may sample a fixed number of two-dimensional proposal locations from among the (x, y) coordinates of the three-dimensional points in the scene using random uniform sampling, in which each two-dimensional proposal location is randomly sampled from a uniform distribution over the three-dimensional points, i.e., the (x,y) coordinates of each three-dimensional point are equally likely to be sampled.

As another example, the proposal location determination engine 250 may sample a fixed number of two-dimensional proposal locations from among the (x, y) coordinates of the three-dimensional points in the scene using farthest point sampling (FPS), in which individual points are selected sequentially such that the next point selected is maximally far away from all previous points selected. The proposal locations 252 that are determined by the proposal location determination engine 250 are provided to the featurizer 260.

The featurizer 260 receives proposal locations 252 as input from the proposal location determination engine 250 and generates, based at least in part on proposal locations 252, a set of feature representations 262.

More specifically, for each two-dimensional proposal location included in the proposal locations 252, the featurizer 260 generates a feature representation from three-dimensional points in the point cloud data that are near the two-dimensional proposal location. As such, in some examples, the featurizer 260 generates feature representations 262 based on proposal locations 252 and based further on at least a portion of sensor data 222 or an abstraction thereof.

In some implementations, the featurizer 260 determines, for each two-dimensional proposal location included in the proposal locations 252, a fixed number of points that have (x, y) coordinates that are within a threshold radius of the proposal location and generates the feature representation for the proposal location from the fixed number of points. For example, the fixed number of determined points may include between 32 and 512 points, and the threshold radius may be set to a value between 2 and 3 meters. Other configurations are possible. In these implementations, the featurizer 260 may generate the feature representation for each two-dimensional proposal location included in the proposal locations 252 from the sampled fixed number of points that have (x, y) coordinates that are within the threshold radius of the respective proposal location. As described in further detail below, in some examples, the featurizer 260 may include a featurizer neural network that may be leveraged to generate the feature representation for each two-dimensional proposal location included in the proposal locations 252.

In some examples, the perception subsystem 230 can modify processes performed by the featurizer 260 based on the amount of computational resources available for the process or the latency requirements for the object detection process. In particular, the perception subsystem 230 can adjust how many points are determined or selected and used for each two-dimensional proposal location to satisfy the resource or latency requirements, i.e., the perception subsystem 230 can adapt to different computational settings without needing to re-train any of the neural network layers that are employed in the perception subsystem 230. In some of these examples, the perception subsystem 230 determines how many points can be sampled for each proposal location while still satisfying latency or resource requirements, and then uses no more than the determined number of points when generating the feature representation. For instance, the perception subsystem 230 may determine how many points can be sampled for each proposal location while still satisfying latency or resource requirements based on how much time and/or compute is required to identify the points and generate the feature representations for the points in the current computational environment. When fewer points need to be used to satisfy the requirements, the perception subsystem 230 can prioritize the points that have higher predictive priorities or that are in spatial regions that are likely to be relevant. For example, in the case of a self-driving vehicle, the perception subsystem 230 can prioritize points that are likely to be relevant to operation of the vehicle.

In at least some of the aforementioned implementations, the featurizer 260 may further receive or otherwise access contextual data 242 and determine or select the fixed number of points for each two-dimensional proposal location included in the proposal locations 252 based on their distance from the proposal location and based further on the contextual data 242.

For example, contextual data 242 may include data from one or more sensors of a self-driving vehicle, and the featurizer 260 may select a fixed number of points that have (x, y) coordinates that are (i) determined to be within a first threshold radius of the proposal location and (ii) determined to be within a second threshold radius of the self-driving vehicle based on contextual data 242.

In some examples, the featurizer 260 may initially sample a larger number of points from the points that have (x,y) coordinates that are within the threshold radius, i.e., a larger number than the fixed number that will be used to generate the feature representation and then rank these points based on a relative importance to operation of the self-driving vehicle of each point based on the contextual data 242. The featurizer 260 may then select, as the determined fixed number of points, a subset of the points that have (x, y) coordinates that are within the threshold radius of the proposal location based at least in part on the ranking. For example, the featurizer 260 may rank the points based on distance from the vehicle or based on other information in the contextual data 242. In this way, the featurizer 260 may be able to prioritize points that are likely to be relevant to operation of the vehicle, and thus achieve computational savings. Other pieces of information that may be included in contextual data 242 and leveraged by the perception subsystem 230 to determine or select points for each proposal location include data indicative one or more computational loads that are currently placed or will be placed on the perception subsystem 230 or one or more other systems of a vehicle, data indicative of a level of confidence in perception output 232, GPS coordinates or other data indicative of a current location of a vehicle, semantic or road map information that may be indicative of regions of pedestrian and/or vehicular traffic, temporal information, data indicative of current or future traffic or weather conditions within the vicinity of a vehicle, historical driving data, data indicative of the current speed or acceleration of a vehicle, data indicative of a vehicle's fuel and/or battery levels, satellite imagery, data communicated from and/or about other nearby vehicles, user preferences, and the like. As such, data that is included or represented in contextual data 242 may originate from a variety of different sources including one or more sensors onboard a vehicle, internet resources, computing devices in communication with the perception subsystem 230, and so on.

In some implementations, contextual data 242 may include data obtained or generated by the perception subsystem 230 for one or more previous frames, including sensor data 222 from one or more previous frames, proposal locations 252 from one or more previous frames, feature representations 262 from one or more previous frames, and/or perception output 232 from one or more previous frames. Such data from previous frames may serve to provide the perception subsystem 230 with a relatively reliable estimate of where objects may be expected to be located. In this way, the perception subsystem 230 may be able to allocate more computational resources to the regions in the scene in which objects are more likely to be located in the current frame and/or allocate fewer computational resources to the regions in the scene in which objects are less likely to be located in the current frame.

In some examples, once the points for a given proposal location have been determined, the featurizer 260 may further re-center each determined point to an origin for the given proposal location, i.e., represent the determined points in a coordinate system in which the given proposal location is located at the origin and then use the re-centered points to generate the feature representation for the determined point.

In at least some of the aforementioned implementations, the featurizer 260 includes a featurizer neural network that may be leveraged to generate feature representations 262. More specifically, for a given proposal location, the featurizer 260 may process a featurizer input for the given proposal location using the featurizer neural network to generate a feature representation for the given proposal location. For example, the featurizer input that is applied to the featurizer neural network may include data indicating a fixed number of points that are determined or selected for the given proposal location. For examples in which the featurizer 260 re-centers each determined point to an origin, the featurizer input that is applied to the featurizer neural network may include data indicating the re-centered points. Furthermore, in some examples, the featurizer input that is applied to the featurizer neural network may include data indicating sensor features for each of the determined points. In some implementations, the featurizer neural network that is included in the featurizer 260 may correspond to featurizer neural network 360, as described in further detail below with reference to FIG. 3.

Figure 3:
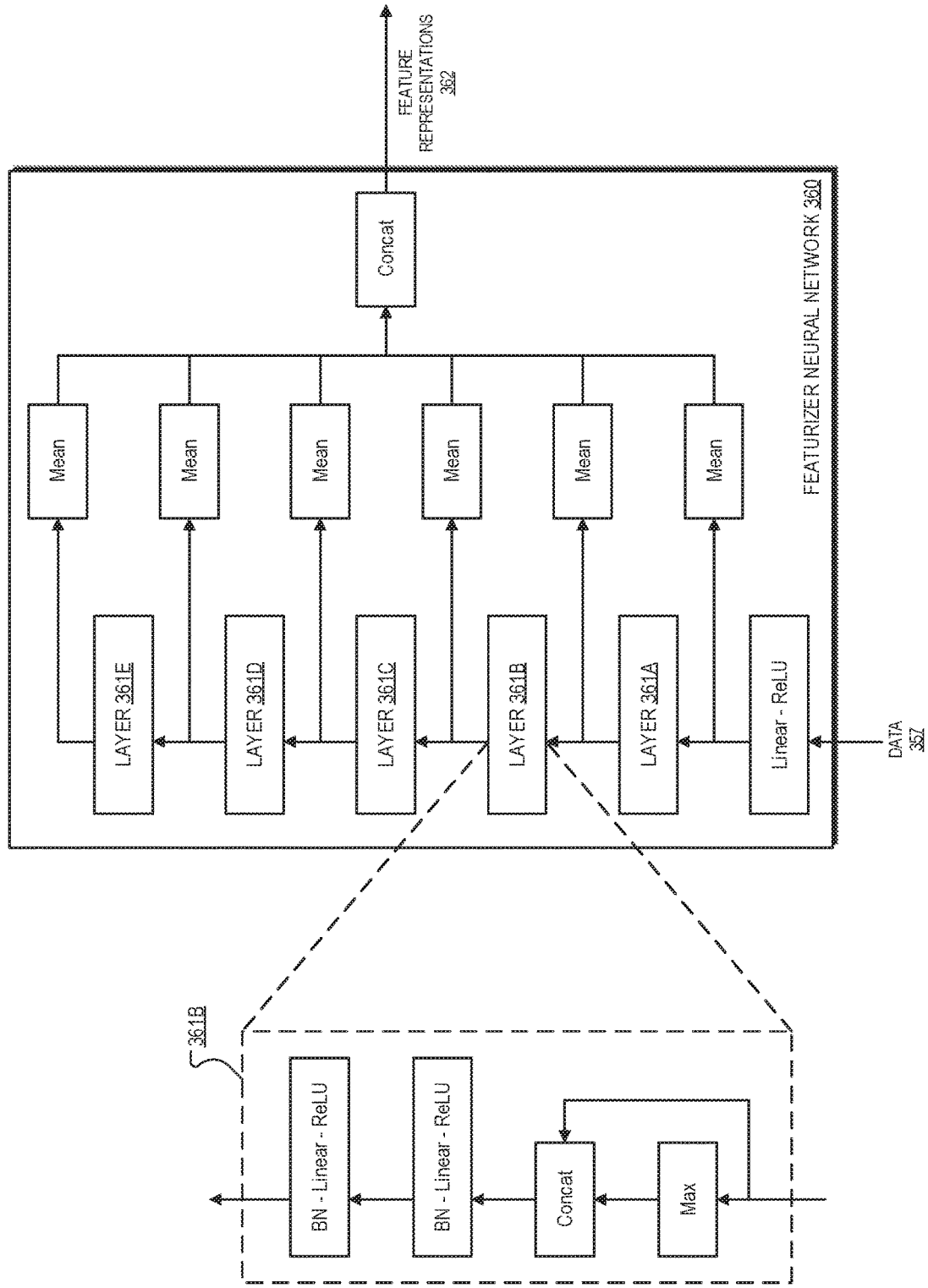
FIG. 3 shows a block diagram of an example featurizer neural network.

FIG. 3 is a block diagram of an example featurizer neural network 360. The featurizer neural network 360 receives data 357 as input and generates, based at least in part on data 357, a set of feature representations 362. As mentioned above, in some implementations, the featurizer neural network 360 may be implemented as part of the featurizer 260 of the perception subsystem 230 as described herein with reference to FIG. 2. In these implementations, data 357 and feature representations 362 may correspond to the featurizer input and feature representations 262 as described above with reference to FIG. 2, respectively. In the example of FIG. 3, the featurizer neural network 360 includes multiple layers 361A-361E (e.g., 5 layers). Although FIG. 3 only includes a detailed diagram of layer 361B, it is to be understood that the architectures of layers 361A and 361C-361E may be similar or equivalent to that of layer 361B. Each one of layers 361A-361E receives a set of points as input, where each point has an associated feature vector. As shown in the detailed diagram of layer 361B, when processing an input for a given point, each one of layers 361A-361E may first compute aggregate statistics across the set of points, e.g., by computing the maximum (max) of each feature across the feature vectors for the set of points, and then concatenate the resulting global statistics back to the given point's feature to generate a concatenated input for the given point. Each one of layers 361A-361E may apply two fully-connected layers, each of which is composed of batch normalization (BN), linear projection, and ReLU activation to the concatenated input for the given point. The featurizer neural network 360 performs a readout of each of layers 361A-361E using aggregation, i.e., aggregates the outputs of each of layers 361A-361E for the set of points to generate a single feature vector, e.g., by computing the means of the outputs of the layer for the individual points in the set of points, and then concatenates the readouts together, i.e., concatenates the means of the layer outputs together, to form the featurization for the proposal location, e.g., feature representations 362. By design, because the outputs of each layer are aggregated before being used in the feature representations, the featurizer neural network 360 can be used with varying numbers of input points, giving it a large degree of flexibility. As such, the number of points that are determined or selected and applied as input to the featurizer neural network 360 may be adjusted to adapt to different computational settings without issue, e.g., without needing to re-train any of layers 361A-361E of the featurizer neural network 360. Although the featurizer neural network 360 is depicted in FIG. 3 as having 5 layers, e.g., layers 361A-361E, it is to be understood that the featurizer neural network 360 may be implemented with greater or fewer than 5 layers.

Referring once again to FIG. 2, the feature representations 262 that are determined by the featurizer 260, which may correspond to the feature representations 362 that are generated by the featurizer neural network 360 as described above with reference to FIG. 3, are provided to the object detection neural network 270 for regression and classification. The perception subsystem 230 processes feature representations 262 using the object detection neural network 270 to generate perception output 232. The perception output 232 that the object detection neural network 270 is configured to generate is an object detection output that identifies objects in the scene. In some examples, the perception output 232 may correspond to perception output 132 as described above with reference to FIG. 1.

In some implementations, to generate the perception output 232, the object detection neural network 270 projects each feature representation included in the feature representations 262 to generate multiple feature vectors for multiple anchor offsets, respectively, and processes the multiple feature vectors to generate an object detection output for each of the multiple anchor offsets. That is, for each proposal location, the neural network 270 generates a respective feature vector for each anchor offset and then processes the feature vector for the anchor offset to generate the object detection output for the anchor offset. In these implementations, each object detection output included in the perception output 232 corresponds to one of the proposal locations and one of the anchor offsets and identifies (i) a location of a possible object relative to a region of the scene that corresponds to the proposal location offset by the anchor offset and (ii) a likelihood that an object is located at the identified location. In at least some of these implementations, different anchor offsets are associated with different projection weights, and to generate a respective feature vector for each anchor offset, the object detection neural network 270 projects each feature representation included in the feature representations 262 in accordance with projection weights associated with the anchor offset. In at least some implementations, the object detection outputs also include a classification output for each of the identified locations and, to generate an object detection output for each of the multiple anchor offsets, the object detection neural network 270 uses the feature vector for the anchor offset to predict classification logits using a classification head and bounding box regression logits for the offset using a regression head, where each head includes one or more fully-connected or convolutional neural network layers. Such predictions may be included or represented in the perception output 232. Furthermore, in some examples, the object detection neural network 270 employs non-maximal suppression (NMS) or at least one technique similar to NMS to remove predictions of the same class that heavily overlap with one another. In these examples, the remaining predictions may be included or represented in the perception output 232.

The perception output 232 that is generated by way of the object detection neural network 270 of the perception subsystem 230 may be provided to one or more systems and used to make autonomous driving decisions for the vehicle, to display information to operators or passengers of the vehicle, or both. For example, the perception subsystem 230 may provide perception output 232 to one or more systems or subsystems that are similar to equivalent to one or more of those described above with reference to FIG. 1, including the planning subsystem 140, a control subsystem, and a user interface subsystem. Other configurations are possible.

The featurizer neural network of the featurizer 260 and the object detection neural network 270 may be trained jointly on ground truth object detection outputs for point clouds in a set of training data. As mentioned above, in some implementations, the featurizer neural network of the featurizer 260 may correspond to the featurizer neural network 360 as described with reference to FIG. 3. The loss function used for the training of these neural networks can be an object detection loss that measures the quality of object detection outputs generated by the these neural networks relative to the ground truth object detection outputs, e.g., smoothed L1 losses for regressed values and cross entropy losses for classification outputs.

In some implementations, the perception subsystem 230 is further configured to remove points that are likely associated with ground reflections from obtained point cloud data. In at least some of these implementations, operations associated with this process may be carried out by the proposal location determination engine 250. For example, the perception subsystem 230 may remove points with positions in the z-dimension that fail to satisfy one or more thresholds. In some examples, the perception subsystem 230 may remove points that are positioned outside of one or more specified ranges of positions in the z-dimension. Doing so may potentially yield computational savings and/or allow the system to focus computational resources on points that are more likely to be associated with a pedestrian, vehicle, or other object of interest.

Although described as distinct modules or components, it is to be understood that some or all of the functionality of each the proposal location determination engine 250, featurizer 260, and object detection neural network 270 may be provided by way of other modules or components of the perception subsystem 230 or in communication with the perception subsystem 230. As one example, in some implementations, one or more of the operations as described above as being performed by the featurizer 260 may be performed by the proposal location determination engine 250, such that the output that is provided to the featurizer 260 by the proposal location determination engine 250 may be similar or equivalent to data 357 as described above with reference to FIG. 3. In such implementations, contextual data 242 may be provided to the proposal location determination engine 250. In some examples, the proposal location determination engine 250 may utilize contextual data 242 to determine proposal locations 252. Other configurations are possible.

Figure 4:
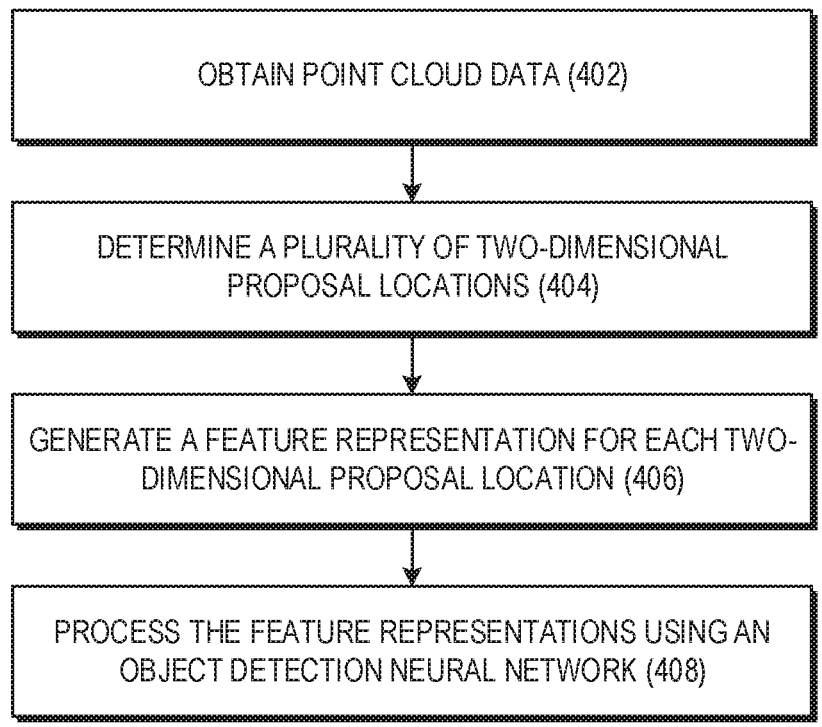
FIG. 4 is a flow diagram of an example process for detecting objects within point clouds.

FIG. 4 is a flow diagram of an example process 400 for detecting objects within point clouds. For convenience, the process 400 will be described as being performed by a system of one or more computers located in one or more locations. For example, an on-board system, e.g., the on-board system 100 of FIG. 1, or subsystems thereof, e.g., the perception subsystem 130 of FIG. 1 or the perception subsystem 230 of FIG. 2, appropriately programmed in accordance with this specification, can perform the process 400. However, process 400 may be performed by other systems or system configurations.

The system obtains point cloud data (402) representing a sensor measurement of a scene captured by one or more sensors. For example, this may correspond to the perception subsystem 130 of the on-board system 100 of FIG. 1 obtaining sensor data 122 from the sensor subsystem of the on-board system 100. Similarly, this may also correspond to the proposal location determination engine 250 of the perception subsystem 230 of FIG. 2 obtaining sensor data 222. The point cloud data that is obtained by the system includes a plurality of three-dimensional points in the scene and, in some implementations, each three-dimensional point in the scene has respective (x, y) coordinates. In some examples, the one or more sensors are sensors of a self-driving vehicle, e.g., one or more LIDAR sensors or depth camera sensors. In some examples, the point cloud data includes sensor features generated by the one or more sensors for each of the three-dimensional points.

The system determines a plurality of two-dimensional proposal locations (404) based on the three-dimensional points in the scene. For example, this may correspond to the proposal location determination engine 250 of the perception subsystem 230 of FIG. 2 determining proposal locations 252 based on sensor data 222. As mentioned above, in some implementations, each three-dimensional point in the scene has respective (x, y) coordinates. In at least some of these implementations, to determine a plurality of two-dimensional proposal locations based on the three-dimensional points in the scene, the system samples a fixed number of two-dimensional proposal locations from among the (x, y) coordinates of the three-dimensional points in the scene. In some examples, the system may use a sampling technique such as farthest point sampling (FPS) and/or random uniform sampling to sample the fixed number of two-dimensional proposal locations.

The system generates a feature representation for each two-dimensional proposal location (406) from three-dimensional points in the point cloud data that are near the two-dimensional proposal location. For example, this may correspond to the featurizer 260 of the perception subsystem 230 of FIG. 2 generating feature representations 262 based on proposal locations 252. In some implementations, to generate a feature representation for each two-dimensional proposal location, the system determines a fixed number of points that have (x,y) coordinates that are within a threshold radius of the proposal location, and generates the feature representation for the two-dimensional proposal location from the sampled fixed number of points that have (x,y) coordinates that are within the threshold radius of the proposal location. As mentioned above, in some examples, the one or more sensors are sensors of a self-driving vehicle. In some of these examples, to determine the fixed number of points that have (x,y) coordinates that are within the threshold radius of the proposal location, in at least some of the aforementioned implementations, the system (i) samples a second, larger number of points from the points that have (x,y) coordinates that are within the threshold radius, (ii) ranks the second number of points based on a relative importance to operation of the self-driving vehicle, and (iii) selects, as the determined fixed number of points, a subset of the sampled second number of points based on the ranking. For instance, the system may rank the second number of points based on a distance from the self-driving vehicle. This may correspond to the featurizer 260 of the perception subsystem 230 of FIG. 2 ranking points within the vicinity of a proposal location, e.g., based at least in part on contextual data 242.

In at least some of the aforementioned implementations, to generate the feature representation for the two-dimensional proposal location, the system (i) generates, for each determined point, a re-centered point that is centered at the two-dimensional proposal location, and (ii) processes a featurizer input including the re-centered points using a featurizer neural network to generate the feature representation. The featurizer neural network may be configured to process a variable number of input points. For example, the featurizer neural network may correspond to the featurizer neural network 360 of FIG. 3. As mentioned above, in some examples, the point cloud data includes sensor features generated by the one or more sensors for each of the three-dimensional points. In at least some of these examples, the featurizer input that the system processes using the featurizer neural network includes the sensor features for each of the determined points.

The system processes the feature representations using an object detection neural network (408) that is configured to generate an object detection output that identifies objects in the scene. For example, this may correspond to the perception subsystem 230 of FIG. 2 processing feature representations 262 using the object detection neural network to generate perception output 232. In some implementations, to process the feature representations of the two-dimensional proposal locations using an object detection neural network, for each proposal location, the system projects the feature representation to generate a respective feature vector for each of a plurality of anchor offsets, and processes the feature vectors to generate, for each of the plurality of anchor offsets, an object detection output that identifies (i) a location of a possible object relative to a region of the scene that corresponds to the proposal location offset by the anchor offset and (ii) a likelihood that an object is located at the identified location. In some examples, different anchor offsets have different projection weights. In at least some of these examples, to generate a respective feature vector for each anchor offset, the system projects the feature representation in accordance with projection weights for the anchor offset.

In some implementations, the process 400 includes one or more additional operations in which the system removes points that are likely associated with ground reflections from obtained point cloud data. For example, the system may remove points that are positioned outside of one or more specified ranges of positions in the z-dimension. As mentioned above with reference to FIG. 2, doing so may potentially yield computational savings and/or allow the system to focus computational resources on points that are more likely to be associated with a pedestrian, vehicle, or other object of interest. In some examples, such one or more additional operations may be performed after the system obtains point cloud data (402), but before the system determines a plurality of two-dimensional proposal locations (404).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
obtaining point cloud data representing a sensor measurement of a scene captured by one or more sensors, the point cloud data comprising a plurality of three-dimensional points and each three-dimensional point having three coordinates in a three-dimensional coordinate system;
determining, based on the three-dimensional points in the scene, a plurality of two-dimensional proposal locations;
generating, for each two-dimensional proposal location, a respective feature representation from three-dimensional points in the point cloud data, wherein the generating comprises, for each two-dimensional proposal location:
  determining a plurality of three-dimensional points in the point cloud data for which a designated pair of the three coordinates are within a threshold radius of the proposal location; and
  generating the feature representation for the two-dimensional proposal location from the plurality of points for which the designated pair of the three coordinates are within the threshold radius of the proposal location; and
processing the feature representations of the two-dimensional proposal locations using an object detection neural network that is configured to generate an object detection output that identifies objects in the scene.

2. The method of claim 1, wherein determining, based on the three-dimensional points in the scene, a plurality of two-dimensional proposal locations comprises:
sampling a fixed number of two-dimensional proposal locations from among the designated pairs of coordinates of the three-dimensional points in the scene.

3. The method of claim 2, wherein sampling the fixed number of two-dimensional proposal locations comprises:
sampling the fixed number of two-dimensional proposal locations using farthest point sampling.

4. The method of claim 2, wherein sampling the fixed number of two-dimensional proposal locations comprises:
sampling the fixed number of two-dimensional proposal locations using random uniform sampling.

5. The method of claim 1, wherein determining a plurality of three-dimensional points in the point cloud data for which the designated pair of the three coordinates are within a threshold radius of the proposal location comprises:
determining a fixed number of points for which the designated pair of the three coordinates are within a threshold radius of the proposal location.

6. The method of claim 5, wherein the one or more sensors are sensors of a self-driving vehicle, and wherein determining a fixed number of points that are within a threshold radius of the proposal location comprises:
sampling a second, larger number of points from the points for which the designated pair of the three coordinates are within the threshold radius;
ranking the second number of points based on a relative importance to operation of the self-driving vehicle; and
selecting, as the determined fixed number of points, a subset of the sampled second number of points based on the ranking.

7. The method of claim 6, wherein ranking the second number of points based on a relative importance to operation of the self-driving vehicle comprises:
ranking the second number of points based on a distance from the self-driving vehicle.

8. The method of claim 1, wherein generating the feature representation for the two-dimensional proposal location comprises:
generating, for each determined point, a re-centered point that is centered at the two-dimensional proposal location; and
processing a featurizer input comprising the re-centered points using a featurizer neural network to generate the feature representation.

9. The method of claim 8, wherein the featurizer neural network is configured to process a variable number of input points.

10. The method of claim 8, wherein the point cloud data includes sensor features generated by the one or more sensors for each of the three-dimensional points, and wherein the featurizer input includes the sensor features for each of the determined points.

11. The method of claim 1, wherein processing the feature representations of the two-dimensional proposal locations using an object detection neural network that is configured to generate an object detection output that identifies objects in the scene comprises:
for each proposal location:
  projecting the feature representation to generate a respective feature vector for each of a plurality of anchor offsets; and
  processing the feature vectors to generate, for each of the plurality of anchor offsets, an object detection output that identifies a location of a possible object relative to a region of the scene that corresponds to the proposal location offset by the anchor offset and a likelihood that an object is located at the identified location.

12. The method of claim 11, wherein projecting the feature representation to generate a respective feature vector for each of a plurality of anchor offsets comprises:
for each anchor offset, projecting the feature representation in accordance with projection weights for the anchor offset, wherein different anchor offsets have different projection weights.

13. The method of claim 1, further comprising removing points that are likely associated with ground reflections from the obtained point cloud data.

14. A system comprising:
one or more computers; and
one or more storage devices communicatively coupled to the one or more computers, wherein the one or more storage devices store instructions that, when executed by the one or more computers, cause the one or more computers to perform operations comprising:
obtaining point cloud data representing a sensor measurement of a scene captured by one or more sensors, the point cloud data comprising a plurality of three-dimensional points and each three-dimensional point having three coordinates in a three-dimensional coordinate system;
determining, based on the three-dimensional points in the scene, a plurality of two-dimensional proposal locations;
generating, for each two-dimensional proposal location, a respective feature representation from three-dimensional points in the point cloud data, wherein the generating comprises, for each two-dimensional proposal location:
  determining a plurality of three-dimensional points in the point cloud data for which a designated pair of the three coordinates are within a threshold radius of the proposal location; and
  generating the feature representation for the two-dimensional proposal location from the plurality of points for which the designated pair of the three coordinates are within the threshold radius of the proposal location; and
processing the feature representations of the two-dimensional proposal locations using an object detection neural network that is configured to generate an object detection output that identifies objects in the scene.

15. The system of claim 14, wherein determining, based on the three-dimensional points in the scene, a plurality of two-dimensional proposal locations comprises:
  sampling a fixed number of two-dimensional proposal locations from among the (x,y) coordinates of the three-dimensional points in the scene.

16. The system of claim 14, wherein determining a plurality of three-dimensional points in the point cloud data for which the designated pair of the three coordinates are within a threshold radius of the proposal location comprises:
  determining a fixed number of points for which the designated pair of the three coordinates are within a threshold radius of the proposal location.

17. The system of claim 16, wherein the one or more sensors are sensors of a self-driving vehicle, and wherein determining a fixed number of points that are within a threshold radius of the proposal location comprises:
  sampling a second, larger number of points from the points for which the designated pair of the three coordinates are within the threshold radius;
  ranking the second number of points based on a relative importance to operation of the self-driving vehicle; and
  selecting, as the determined fixed number of points, a subset of the sampled second number of points based on the ranking.

18. The system of claim 17, wherein ranking the second number of points based on a relative importance to operation of the self-driving vehicle comprises:
  ranking the second number of points based on a distance from the self-driving vehicle.

19. The system of claim 14, wherein generating the feature representation for the two-dimensional proposal location comprises:
  generating, for each determined point, a re-centered point that is centered at the two-dimensional proposal location; and
  processing a featurizer input comprising the re-centered points using a featurizer neural network to generate the feature representation.

20. One or more non-transitory computer storage media storing instructions that when executed by one or more computers cause the one or more computers to perform operations comprising:
  obtaining point cloud data representing a sensor measurement of a scene captured by one or more sensors, the point cloud data comprising a plurality of three-dimensional points and each three-dimensional point having three coordinates in a three-dimensional coordinate system;
  determining, based on the three-dimensional points in the scene, a plurality of two-dimensional proposal locations;
  generating, for each two-dimensional proposal location, a respective feature representation from three-dimensional points in the point cloud data, wherein the generating comprises, for each two-dimensional proposal location:
    determining a plurality of three-dimensional points in the point cloud data for which a designated pair of the three coordinates are within a threshold radius of the proposal location; and
    generating the feature representation for the two-dimensional proposal location from the plurality of points for which the designated pair of the three coordinates are within the threshold radius of the proposal location; and
  processing the feature representations of the two-dimensional proposal locations using an object detection neural network that is configured to generate an object detection output that identifies objects in the scene.

* * * * *